Patented Oct. 30, 1923.

1,472,403

UNITED STATES PATENT OFFICE.

FOORD VON BICHOWSKY, OF GLENDALE, CALIFORNIA.

PROCESS FOR THE SYNTHETIC PRODUCTION OF ALKALI-METAL CYANIDES.

No Drawing.   Application filed June 1, 1921. Serial No. 474,222.

*To all whom it may concern:*

Be it known that I, FOORD VON BICHOWSKY, a citizen of the United States of America, residing in the city of Glendale, in the county of Los Angeles and State of California, have invented certain new and useful Improvements in Processes for the Synthetic Production of Alkali-Metal Cyanides, of which the following is a specification.

In applications for United States Letters Patent Serial Numbers 419,458 now Patent No. 1,417,702 and 447,244, dated October 25, 1920, and February 23, 1921, respectively, filed jointly with John Harthan we disclosed a method of preparing cyanides of the alkali metals by heating a suitable nitride together with an alkali metal salt in the absence of carbon as a chemical reactive but in the presence of a carbide of iron. I have now extended the scope of that invention by further discovering that carbides other than iron are also suitable for the carrying out of the above process. The present invention deals especially with those carbides whose proportion of combined carbon is relatively high such as calcium carbide or other carbides of the alkaline earth metals, but even such comparatively unreactive carbides as the carbides of silicon easily give up their combined carbon when heated in the presence of a suitable nitride and an alkali metal oxide or other hereinafter described salt. By a suitable nitride I also include the so called carbonitride or cyanonitrides produced as in my application 447,281, filed February 23, 1921, or by any other method desired. These nitrides may be the nitrogen compounds of any metal capable of directly or indirectly combining with nitrogen as for example, aluminium, silicon, chromium, iron, lithium, magnesium, zirconium, titanium, niobium, tungsten, vanadium, molybdenum, zinc, barium, calcium, boron and the like or impure mixtures of the same.

By a suitable alkali metal compound is meant an oxide, hydroxide, carbonate or a halogen salt such as chloride either singly or in mixtures, with or without a fluxing agent. The use of strongly oxidizing agents such as chlorates or sulphur compounds such as sulphates is inadvisable, for in the first case cyanates would partially result and in the latter case sulpho-cyanides would be formed as impurities.

In addition to the carbides already mentioned many others may be used as for example, tungsten, aluminium, barium, manganese and numerous other simple or complex carbides.

The temperature employed should be in general as low as possible in order to avoid any loss of combined nitrogen. I have found that when working with relatively stable nitrides, and by using a flux, that temperatures as low as 700° C. can be profitably employed. The advantage of low temperature is especially noticeable in the presence of certain impurities such as metallic iron and other substances which at higher temperatures would tend to rapidly decompose the cyanide formed but which have a neutral and sometimes even a beneficial effect at lower temperatures and may thus catalytically help in the formation of the cyanides. Among these substances may be mentioned the alkali metal cyanides which may be added, if so desired, to the reactive mass either to shorten the time of reaction, or to lower the temperature of reaction or to cause the reaction to run more smoothly or for all three purposes combined. Since the temperature employed is low, fusion of the reactive mass is avoided and the material may be used in the form of strongly compressed briquettes made up with or without a binder. If these briquettes be heated and finally allowed to cool, in an atmosphere of hydrogen or other inert gas, the alkali metal cyanides formed will serve as a binder and the briquetted material will be found to be quite hard and well sintered when removed from the heating chamber. The scope of the present invention is particularily broad and the process outlined is valuable inasmuch as under favorable conditions practically all of the nitride is converted into an alkali metal cyanide, while the other products of the reaction may be recovered and reconverted into their original form. Finally the reaction may be carried out in a continuous manner by the use of a tunnel or other similar kiln.

The following examples will serve to illustrate further the nature of my invention, which, however, is not confined to these examples, and the method of carrying it into practical effect. The parts are by weight:—

1. Briquette together a mixture consisting of 2 parts finely ground titanium nitride $Ti_2N_2$, 2 parts of a previously fused and then ground mixture of equal molecular weights of sodium and potassium carbonates, 1 part of commercial calcium carbide, and heat for one hour at about 775°C. The alkali metal cyanides are formed in almost the theoretical quantity and can be extracted with water from the relatively insoluble residue. Any excess carbide will be converted into calcium hydrate and that will react in turn with any excess sodium carbonate forming calcium carbonate and sodium hydroxide. The sodium cyanide can be easily separated from the very soluble hydroxide by crystallization or precipitation with alcohol or the like. The residual titanium oxygen compound can be recovered and easily reconverted into its nitrogen compound.

2. Briquette together 3 parts of finely ground silicon nitride (SiN), 2 parts anhydrous sodium carbonate to which a little sodium cyanide has been added as a catalytic agent, and a little sodium chloride as a flux, 1 part commercial carborundum powder (SiC), heat the briquettes so formed for 1 hour at about 800°C. When cold the soluble cyanides can be easily extracted with water since the other products of the reaction are practically insoluble in that solvent. Upon evaporating the solution so obtained to dryness practically pure sodium cyanide is at once obtained.

I claim:

1. The synthetic production of sodium cyanide by heating a nitride with a carbide together with sodium carbonate at such a temperature that the loss of nitrogen as such is practically avoided while the sodium carbonate is converted into sodium cyanide and the carbide into an oxygen containing compound.

2. The synthetic production of sodium cyanide by heating a nitride with a carbide with sodium carbonate and a flux thus enabling a temperature to be used at which the loss of nitrogen as such may be avoided while at the same time the sodium carbonate is converted into sodium cyanide and the carbide into an oxygen containing compound.

3. The synthetic production of sodium cyanide by heating a silicon nitride with silicon carbide and sodium carbonate containing sodium chloride as a flux or catalyst at a temperature at which the loss of nitrogen is practically avoided.

4. The synthetic production of sodium cyanide by heating a silicon nitride with silicon carbide and sodium carbonate containing sodium chloride as a flux at a temperature in the neighborhood of 800°C.

FOORD VON BICHOWSKY.